(12) United States Patent
Buettiker et al.

(10) Patent No.: US 9,955,814 B2
(45) Date of Patent: May 1, 2018

(54) BREWING UNIT FOR A COFFEE MACHINE, AND COFFEE MACHINE

(71) Applicant: JURA Elektroapparate AG, Niederbuchsiten (CH)

(72) Inventors: Philipp Buettiker, Oberbuchsiten (CH); Georg Sahli, Ersigen (CH); Erich Ullmann, Egerkingen (CH); Stephan Probst, Subingen (CH)

(73) Assignee: JURA Elektroapparate AG, Niederbuchsiten (CH)

( * ) Notice: Subject to any disclaimer, the term of this patent is extended or adjusted under 35 U.S.C. 154(b) by 0 days. days.

(21) Appl. No.: 15/301,071

(22) PCT Filed: Apr. 15, 2015

(86) PCT No.: PCT/CH2015/000057
§ 371 (c)(1),
(2) Date: Sep. 30, 2016

(87) PCT Pub. No.: WO2015/157872
PCT Pub. Date: Oct. 22, 2015

(65) Prior Publication Data
US 2017/0013992 A1    Jan. 19, 2017

(30) Foreign Application Priority Data

Apr. 15, 2014    (EP) .................................... 14405034

(51) Int. Cl.
*A47J 31/36*    (2006.01)
*A47J 31/42*    (2006.01)
*A47J 31/40*    (2006.01)

(52) U.S. Cl.
CPC ....... *A47J 31/3614* (2013.01); *A47J 31/3609* (2013.01); *A47J 31/42* (2013.01)

(58) Field of Classification Search
CPC .... A47J 31/3609; A47J 31/3614; A47J 31/42; A47J 31/3619
(Continued)

(56) References Cited

U.S. PATENT DOCUMENTS

| 3,537,383 A | 11/1970 | Croce |
| 5,259,296 A | 11/1993 | Mikael et al. |

FOREIGN PATENT DOCUMENTS

| DE | 19 03 859 A1 | 9/1969 |
| EP | 0 559 620 A1 | 9/1993 |
| EP | 2 229 848 A1 | 9/2010 |

OTHER PUBLICATIONS

International Search Report of PCT/CH2015/000057, dated Jul. 16, 2015.

*Primary Examiner* — Eric Stapleton
(74) *Attorney, Agent, or Firm* — Collard & Roe, P.C.

(57) ABSTRACT

Within a brewing unit for a coffee machine, a brewing chamber, which is arranged in a pivotable brewing cylinder, can be filled with ground coffee powder by using a filling device. For the purpose of introducing the coffee powder, the brewing chamber has a filling opening. With the aim of avoiding undesired deposits of grounds in the region of the upper side of the brewing unit, and also of improving levels of hygiene, a projection extends in the filling direction outside the brewing chamber, wherein the projection is such that the exit region of the filling device is introduced with the formation of an interspace between the projection and a side wall of the exit region such that the projection substantially fully surrounds the exit opening of the exit region. Coffee powder supplied in the filling device drops from the exit opening of the exit region, directly through a through-opening of the projection and the filling opening, into the brewing chamber without striking against the projection.

13 Claims, 7 Drawing Sheets

(58) Field of Classification Search
USPC .................... 99/280, 286, 287, 289 R, 302 P
See application file for complete search history.

BREWING UNIT FOR A COFFEE MACHINE, AND COFFEE MACHINE

CROSS REFERENCE TO RELATED APPLICATIONS

This application is the National Stage of PCT/CH2015/000057 filed on Apr. 15, 2015, which claims priority under 35 U.S.C. §119 of European Application No. 14405034.1 filed on Apr. 15, 2014, the disclosure of which is incorporated by reference. The international application under PCT article 21(2) was not published in English.

The present invention relates to a brewing unit for a coffee machine and a coffee machine.

Coffee machines known from the prior art comprise a plurality of components which interact in an automatic or automatable manner so that freshly brewed hot drinks, generally coffee or coffee mix drinks, can be obtained with minimised user interaction.

For this purpose coffee machines known from the prior art generally have a so-called brewing unit, which in turn has a brewing chamber which can be filled with ground product, as a rule with ground coffee powder. After having been filled with ground product, parts of such a brewing unit can be pivoted in such a way that the filled ground product is compressed and through the introduction of brewing water mixed therewith so that on the outlet side the brewed hot drink can be obtained from the brewing unit. In general this is followed by automatic ejection of the compressed ground product (coffee grounds) through movement of further parts of the brewing unit.

Current coffee machines are now also characterised in that they also have a grinder which at the inlet side can be filled with unground, roasted coffee beans and which, for providing a hot coffee drink, on the outlet side can supply ground product with the desired degree of grinding, obtained through grinding the coffee beans, and in the required quantity to the brewing unit, more precisely to the brewing chamber of the brewing unit. For this, a brewing cylinder, for example, having the brewing chamber, can be pivoted within the brewing unit for carrying out the filling procedure such that an opening of the brewing chamber is arranged underneath the outlet of the grinder so that ground coffee powder can fall from the grinder outlet through the opening (hereinafter "filling opening") into the brewing chamber of the brewing unit.

For example, from EP 0 559 620 A1 a brewing unit for a coffee machine is known which comprises a pivotable brewing cylinder of the aforementioned type, wherein for filling the brewing chamber with coffee powder the brewing cylinder can be pivoted into a position in which the filling opening of the brewing unit is arranged underneath the outlet opening of a grinding funnel, which serves to receive the ground product (coffee powder) produced by way of the grinder, so that ground product can sprinkle out of the outlet opening of the grinding funnel through the filling opening.

Due to electrostatic charging of the ground product during the grinding procedure as well as due to other possible interfering effects, in the conventional brewing units, for example in the case of the brewing unit known from EP 0 559 620 A1 or EP 2 229 848 A1, the undesirable effect is now seen that during the filling process some of the individual powder particles of the ground product do not sprinkle through the filling opening of the brewing chamber and into the latter, but as a result of the electrostatic charge become dispersed on the upper side of the brewing unit. Particularly then when the brewing chamber is to be filled with a large quantity of powder, for example with the maximum powder capacity, undesirably great dispersion of the individual powder particles on the upper side of the brewing unit occurs.

Because of the warm and damp environment, such depositing of the powder particles on the upper side of the brewing unit leads to hygienic problems at these points of the brewing unit when dispensing coffee.

DE 19 03 859 A1 discloses a machine for preparing coffee infusions which comprises a movable plate 11 which has a through hole 20 for receiving a quantity of fresh coffee powder for the preparation of a coffee infusion and can be moved in such a way that it can be brought into two different positions. In a first position the plate 11 is brought into a "filling position" in which at its upper side the hole 20 is opposite a supply device for fresh quantities of coffee powder. This supply device for coffee powder comprises in particular a sleeve 21 which is arranged above the plate 11 and essentially extends vertically upwards, and a dosing funnel 25, the lower end of which projects from above over part of its length into the inside of the sleeve 21 so that there is an intermediate space between the outer side of the dosing funnel 25 and the inner side of the sleeve 21. Through the dosing funnel 25 and the sleeve 21 coffee powder can be filled into the hole 20 of the plate 11 if the plate 11 is in the first position. At its upper end the sleeve 21 has an asymmetrically widened section 24 which acts as a sliding surface for the coffee powder which can be supplied from the dosing funnel 25. This widened section 24 of the sleeve ensures that there is sufficient space available in the upper area of the sleeve 25 so that on the one hand the lower end of the dosing funnel 25 can project over part of its length from above into the inside of the sleeve 21 and also that there is enough space next to the dosing funnel 25 to pass a plunger 26 alongside the dosing funnel 25 from above through the sleeve 21 in the longitudinal direction of the sleeve 25 and thereby compress a quantity of coffee powder, which is filled into the sleeve 21, in the hole 20 in the vertical direction into a pre-pressed tablet 45 of fresh coffee powder. If the plate 11 is brought into the second position, the hole 20 is in a position in which the upper side of the hole 20 is directly underneath a filter plunger 32 which can be moved in the vertical direction and which, among other things, comprises a pipeline 35 for supplying hot water, and the lower side of the hold 20 is directly above a filter plunger 31 which can be moved the vertical direction and which, among other things, comprises a pipeline 135 for removing a coffee drink (coffee infusion). If the plate 11 is in the second position and has also already been filled with compressed coffee powder (in the form of a tablet 45), the filter plunger 31 and the filter plunger 32 could be pressed vertically against the plate 11 so that the hole 20, together with the filter plungers 31 and 32 forms a "brewing chamber", which is delimited at the top by the perforated filter 33 and at the bottom by the perforated filter 133. In this situation hot water can thus be introduced into the hole 20 from above via the pipeline 35 and the perforated filter 33 in order to brew the fresh coffee powder (tablet 45) located in the hole 20. Accordingly, brewed coffee can flow out downwards via the perforated filter 133 and the pipeline 135. After finishing producing a drink from brewed coffee in the above manner, the plate 11 can be brought back into the first position. After brewing with hot water, the pre-compressed tablet 45 forms a "leached out tablet 43", which contains absorbed water and forms a relatively compact and solid mass which fills the hole 20 and initially is firmly held in the hole 20. If, after producing a drink from brewed coffee, the plate 11 is moved back into the first position, the hole 20 is accordingly filled with a leached out tablet 43 which closes the hole 20. To produce a further drink from brewed coffee, in this first position of the plate 11 free coffee powder can again be filled into the sleeve 21 via the dosing funnel 25. The thus filled fresh coffee powder then collects on the leached-out tablet 43 located in the hole 20. The filled fresh powder can then be compressed downwards with the plunger 25. In doing so the leached out tablet 43 is conveyed downwards out of the hole 20 and in the hole a new pre-compressed tablet 45 of fresh powder is formed which fills the hole 20 and on the lower side is delimited by the leached-out tablet 43 previously conveyed out of the hole 20.

The machine disclosed in DE 19 03 859 A1 inter alia has the drawback that at least part of the fresh coffee powder filled by the dosing funnel into the sleeve 21 to fill the hole 20 adheres to the inner wall of the sleeve 21, in particular in the area of the widened section 24 of the sleeve 21, and during filling the coffee powder the sleeve 21 may become electrostatically charged (caused by electrostatic charging of the supplied coffee powder). In connection with the repeated preparation of coffee infusions, the portion of the powder which adheres to the sleeve 21 can come into contact with moisture (particularly in the form of water vapour which after the preparation of a coffee infusion can escape from the leached-out tablet 43 and condense on the inner wall of the sleeve 21) and as result of this moisture combine to form a mass which firmly adheres to the inner wall of the sleeve 21, particularly in the area of the widened section 24. This has the result that particularly in the area of the widened section 24 of the sleeve 21 more and more coffee powder accumulates and adheres firmly to the inner wall of the sleeve 21. There is therefore a risk after several preparations of coffee infusions of the sleeve 21 becoming blocked, and consequently the supply of coffee powder from the dosing funnel 25 being prevented. Electrostatic charging of the sleeve 21 through the powder adhering to the inner wall of the sleeve 21 also has the disadvantageous effect that coffee powder additionally supplied through the dosing funnel 25 is electrostatically repelled by the sleeve 25 and due to this electrostatic charge is diverted in such a way that it at least partially leaves the dosing funnel 25 upwards. The latter leads to coffee powder being deposited outside the sleeve 21 and thus, as a result of the warm and moist environment when making coffee, also to hygienic problems.

The present invention is therefore based on the task of proposing a brewing unit for a coffee machine in which the hygienic conditions are improved.

This task is solved through a brewing unit according to the features of independent claim 1.

More particularly, the task is solved by way of a brewing unit for a coffee machine, wherein the brewing unit comprises a brewing chamber which can be filled with ground coffee powder by way of a filling device, wherein the brewing chamber has a filling opening for filling the coffee powder in a filling direction, wherein arranged above the filling opening is a projection extending to outside the brewing chamber in the filling direction, wherein the filling device has an outlet area which comprises an outlet opening for the coffee powder and a side wall extending along the outlet opening and delimiting the outlet opening, and wherein the projection is formed by a wall which extends along a closed curve running around the outlet area of the filling device and has an inner circumferential area which delimits a through opening, which is open at the top and bottom, of the projection and is configured in such a way that the outlet area of the filling device is introduced into the through opening of the projection, forming an intermediate space between the inner circumferential area of the projection and the side wall of the outlet area, in such a way that the projection essentially fully surrounds the outlet opening of the outlet area and the projection is not in contact with the side wall of the outlet area.

According to the invention the projection and the outlet area of the filling device are arranged relative to each other in such a way that coffee powder provided in the filling device falls from the outlet opening of the outlet area directly through the through opening of the projection and the filling opening into the brewing chamber without hitting the inner circumferential surface of the projection when falling through the through hole.

The advantages of the solution according to the invention are evident. Above the filling opening of the brewing chamber a projection is provided which, in connection with the appropriate filling pivoting position of the brewing cylinder of the brewing unit, extends in the filling direction, i.e. as a rule in the direction of the outlet area of a grinding funnel which serves as a filling device.

The invention is based on the observation that ground coffee powder provided in the filling device for filling the brewing chamber of a brewing unit can in general be electrostatically charged. This applies in particular to freshly ground coffee powder: when grinding coffee beans in a conventional grinder, a ground product of comminuted particles (coffee powder or powder particles) is often produced which can become relatively strongly electrostatically charged, wherein the electrostatic charge of the individual particles can depend on design details of the grinder (e.g. the material of the grinding elements used for comminuting the coffee beans) and/or details of the grinding process (e.g. the speed at which the grinding elements for comminuting the coffee beans are moved relative to the coffee beans). On filling of the brewing chamber with coffee powder, this electrostatic charging of the ground product can influence the movement of individual particles of the ground products on their way from the outlet opening of the filling device into the brewing chamber. Here, several effects can play a part and influence the individual particles of the ground product in different ways. On the one hand the ground product can bring about electrostatic charging of individual areas of the brewing unit, wherein the electrostatically charged areas of the brewing unit in turn influence the movement of electrostatically charged particles of the ground product leaving the filling device through the outlet opening. During filling of the brewing chamber more and more ground product consisting of electrostatically charged particles then accumulates. Accordingly, on filling the brewing chamber with a pre-determined quantity of coffee powder an interaction takes place between electrostatically charged coffee powder which at a particular point in time during filling is already in the brewing chamber, and electrostatically charged coffee powder which is to be supplied from the outlet opening of the filling device of the brewing chamber at a later point in time. This interaction is determined in particular through electrostatic repelling of particles with the same electrostatic charge. This interaction can be particularly pronounced if the brewing chamber is already at least partially filled with (electrostatically charged) coffee powder. The latter can result in that in some circumstances due to electrostatic repelling by other electrostatically charged coffee powder being already present in the brewing chamber, (electrostatically charged) coffee powder falling from the outlet opening does not land in the brewing chamber, but outside the brewing chamber and can thus contribute to contamination of the brewing unit.

If coffee powder is provided in the filling device which is electrostatically charged, this generally has the effect that the outlet area of the filling device and, in particular, the side walls of the filling device delimiting outlet opening of the filling device, can be become relatively strongly electrostatically charged.

In contrast to the brewing units known from the prior art, it is now envisaged that this outlet area of the filling device, in general therefore the outlet area of the grinding funnel below the grinder, is introduced into the area of the projection, namely in such a way that an intermediate space is formed between the projection extending in the filling direction and the side wall of the outlet area and the projection does not come into contact with the side wall of the outlet area. Under these circumstances—if electrostatically charged coffee powder is provided—the side wall of the outlet area of the filling device can be electrostatically charged without this leading to electrostatic charging of the projection.

As the projection and the outlet are arranged relative to each other in such a way that the coffee powder provided in the filling device falls from the outlet opening of the outlet area directly through the through opening of the projection and the filling opening into the brewing chamber without hitting the inner circumferential surface of the projection when falling through the through opening, it is also achieved that coffee powder leaving the outlet opening reaches the brewing chamber through the through opening of the projection without coming into contact with the wall of the projection and without sliding along the inner circumferential surface of the projection. On the one hand this means that the coffee powder falling through the through opening cannot directly electrostatically charge the projection. It is also prevented that coffee powder falling through the through opening directly adheres in the through opening of the projection or to the inner circumferential surface of the projection.

The configuration of the projection also means that during filling of the brewing chamber with a predetermined quantity of coffee powder undesirable influences of the interaction between electrostatically charged coffee powder already present in the brewing chamber at a particular point in time during filling and electrostatically charged coffee powder to be supplied at a later point in time from the outlet opening of the filling device to the brewing chamber is drastically reduced, in particular if the brewing chamber is already partially filled with electrostatically charged coffee powder. If, when the brewing chamber is already at least partially filled with electrostatically charged coffee powder, further coffee powder is added through the outlet opening of the filling device, this can have the effect that through the electrostatic repulsion between different powder particles, at least some of the powder particles filled into the brewing chamber are pushed out of the brewing chamber and in this way are caused to leave the brewing chamber through the filling opening of the brewing chamber. However, the powder particles which leave the brewing chamber in this way generally collide with the projection or with the outlet area of the filling device and fall back into the brewing chamber. The projection essentially contributes to powder particles actually landing in the brewing chamber during filling of the brewing chamber (and not outside the brewing chamber), even if the coffee powder is relatively strongly electrostatically charged. Through this the formation of deposits of coffee powder outside the brewing chamber, which could constitute a hygiene problem, is effectively reduced or completely suppressed.

After grinding, the possibly electrostatically charged ground product is thus not electrostatically attracted by the upper side of the brewing unit, i.e. particularly with larger quantities of ground product the charged products do not disperse in an uncontrolled manner towards the end of the filling procedure. Rather, the projection largely prevents that these powder particles come to lie on the upper side of the brewing unit.

In connection with this, the fact that an intermediate space is formed between the projection and a side wall of the outlet areas is also essential for another reason. Namely, it has been shown that through the provision of such an intermediate space between the projection and the side wall of the outlet area, the effect of the brewing unit according to the invention is improved in that deposits of ground product (coffee powder) are further reduced.

On the one hand the intermediate space serves to influence the turbulence occurring during filling of the ground product in such a way that only few or no deposits are formed on the upper side of the brewing unit. In particular, with regard to this the intermediate space also serves to remove air during the filling procedure.

If, after a completed brewing procedure, the brewing cylinder of the brewing unit is pivoted back into the filling position so that the filling opening of the brewing chamber is again flush with the projection, moist, warm vapours must also be discharged which in the event of congestion could also lead to disadvantageous deposit formation (outside the brewing chamber, in the through opening of the projection, for example). The intermediate space therefore also has the function of removing these moist, warm vapours.

Particularly in the case of a symmetrical design of both the outlet area and the projection, particularly preferably in the case of complementary shaping of these parts, the intermediate space related to the inner circumferential surface is equal size at every point. In other words: in the intermediate space the outlet area is at the same distance from the projection.

In one form of embodiment of the invention it is envisaged, for example, that the filling device has at least one grinding funnel at the lower end of which the outlet area is formed. The outlet area has an opening cross-section which is smaller than the opening cross-section of the projection (i.e. the cross-section of the through opening of the projection), namely in such a way that in the intermediate space the outlet area is at a distance of between 1 mm and 20 mm from the projection. This range should be understood to the effect that the intermediate space relating to the inner circumferential surface of the projection has an essentially uniform distance, wherein this distance is in a range of between 1 mm and 20 mm depending on the relevant usage conditions. It has been shown that within this distance range advantageous effects are achieved in that the formation of undesirable deposits is effectively prevented.

According to a further aspect of the invention it is envisaged that the projection is formed integrally with the brewing unit. This has the particular advantage that, due to the thus obtained stability, the projection is very durable.

Alternatively the projection can also be designed to be detachable from the brewing unit. This lends itself, in particular, to the retrofitting of the projection to existing brewing units. For this, a screw, snap or clip-type device is provided on the projection for the optional equipping the brewing unit with the projection. Preferably, in this case a complementary screw, snap or clip-type device is provided on the brewing unit. Such a configuration results in particularly good flexibility.

According to one aspect of the invention, it is envisaged that the projection is formed of a wall (hereinafter also referred to as "powder collar") which extends along a closed curve, running around the outlet area of the filling device, and has a closed inner circumferential surface. This projection can, for example, be cylindrical in design and have a closed inner circumferential surface. In this case the projection extends with an essentially circular cross-section from the filling opening of the brewing chamber in the filling direction, i.e. in the direction of the outlet area of the filling device. Such a cylindrical or tubular shape ensures a particularly simple construction. The cross-section of the projection and/or the cross-section of the inner circumferential surface of the projection can, however, be of any other (not circular) shape.

The inner circumferential surface of the projection can have a high-gloss surface or at least in parts be designed as a high-gloss surface. In this case the inner circumferential surface is particularly smooth and thereby has the advantage that depositing of coffee powder on the inner circumferential surface can largely be prevented.

According to a further aspect of the invention it is envisaged that the projection is formed by a wall, which has an upper end and a wall height of between 5 mm and 50 mm. Particularly in combination with the aforementioned advantageous range of the intermediate space, such a projection with such a wall height provides reliable results in the prevention of undesirable deposits.

In connection with this it can be envisaged that the wall thickness of the projection (the wall thickness of the powder collar) is between 0.5 mm and 3 mm. Through this, with minimum material usage a particularly reliable effect with regard to the prevention of deposits is achieved.

In order to prevent the depositing of coffee powder on the upper end of the projection, or to reduce it as far as possible, it is advantageous if the wall thickness of the wall forming the projection is as small as possible. Effective prevention or reduction of deposits on the upper end of the projection is already achieved if, at its upper end, the wall forming the projection—at least in a wall section extending over a height of 0.5 to 5 mm with regard to the upper end of the wall—has a wall thickness of 0.5 mm to 1 mm.

The design of the outlet area of the filling device also has an influence on whether coffee powder falls into the brewing chamber during filling, or is diverted when falling, for example due to electrostatic attraction between electrostatically charged coffee powder particles and the outlet area of the filling device and eventually landing outside the brewing chamber. In order to achieve that the coffee powder falls into the brewing chamber as accurately as possible, it is advantageous if the outlet opening for the coffee powder is delimited by a surrounding wall (e.g. the side wall of the outlet area) which at least in the area of the outlet opening has as small a wall thickness as possible. This considerably reduces the effect of electrostatic attraction between electrostatically charged coffee powder particles and the outlet area of the filling device.

In connection with this it is, for example, expedient if the outlet opening of the outlet area is arranged on a lower end of the side wall of the outlet area, wherein at its lower end, this side wall—at least in a wall section of the side wall extending over a height of 0.5-5 mm in relation to the lower end of the side wall—has a wall thickness of 0.5 mm to 1 mm.

According to a further aspect of the invention the filling device also has at least one guide device. In particular, this guide device is in the form of a guide plate, wherein this guide device is configured to passively convey the coffee powder to be filled to the filling opening of the brewing chamber. Such a guide plate, which is advantageously attached directly at the outlet of the grinder and preferably partially or fully covers the grinder outlet channel, has the advantage that on leaving the grinder outlet channel, charged ground product particles, i.e. charged powder particles and suchlike, also hit this guide plate, i.e. bounce off this guide device, and are directed toward the brewing chamber.

According to a further aspect of the invention it is envisaged that the outlet area of the filling device is introduced to a predetermined depth into the projection area. In doing so the outlet area of the filling device is introduced into the through opening of the projection with a penetration depth which—in relation to the upper end of the wall—is a least 1 mm and is not greater than the wall height. Preferably the penetration depth is 1 mm to 20 mm.

The term "projection area" is here understood to mean that, for example in the case of a cylindrical design of the projection this area starts on penetration of an imaginary cover plate of the projection resting on the edge of the projection. The penetration depth is then defined in such a way as to indicate the distance between this area of the imaginary cover plate and the outlet opening of the filling device, i.e. the distance to the outlet opening of the grinding funnel or suchlike.

In a coffee machine, this position, in which the outlet area of the grinding funnel is introduced by preferably 1 mm to 20 mm into the projection area, can be assured by the fixed arrangement of the brewing unit relating to the grinder.

Even as of such a small penetration depth, by way of the solution according to the invention it is possible to effectively reduce or completely prevent the formation of deposits when filling the brewing chamber of the brewing unit.

According to a further aspect of the invention it is envisaged to provide a coffee machine with at least one grinder and one brewing unit accordance with the invention. The brewing unit has a pivotable brewing cylinder within which the brewing chamber is formed. A skimming device is also provided on the projection which is designed to skim off excess ground coffee powder during the movement of the brewing cylinder.

This additional skimming device is made of a soft material, for example a rubber material or silicone or similar. Preferably it is provided on the projection, more precisely on the lower edge of the projection along which the brewing cylinder is moved.

When pivoting the brewing cylinder, for example when pivoting into the filling position or out of the filling position into a brewing position or similar, the skimming device serves to remove possible deposits on the upper side of the brewing cylinder. In this way the formation of unwanted deposits can be further reduced.

In a further embodiment of the coffee machine the movement of the brewing cylinder is a pivoting movement which takes place relative to the projection. As such a pivoting movement has to take place in current coffee machines anyway in order to move the brewing cylinder between its filling position and the further positions required for the brewing process, in an advantageous embodiment of the skimming device excess ground coffee powder is skimmed off automatically and therefore in a particularly simple manner.

Below, examples of embodiment of the solution according the invention are explained in more detail with the aid of a drawing.

Figure 1:
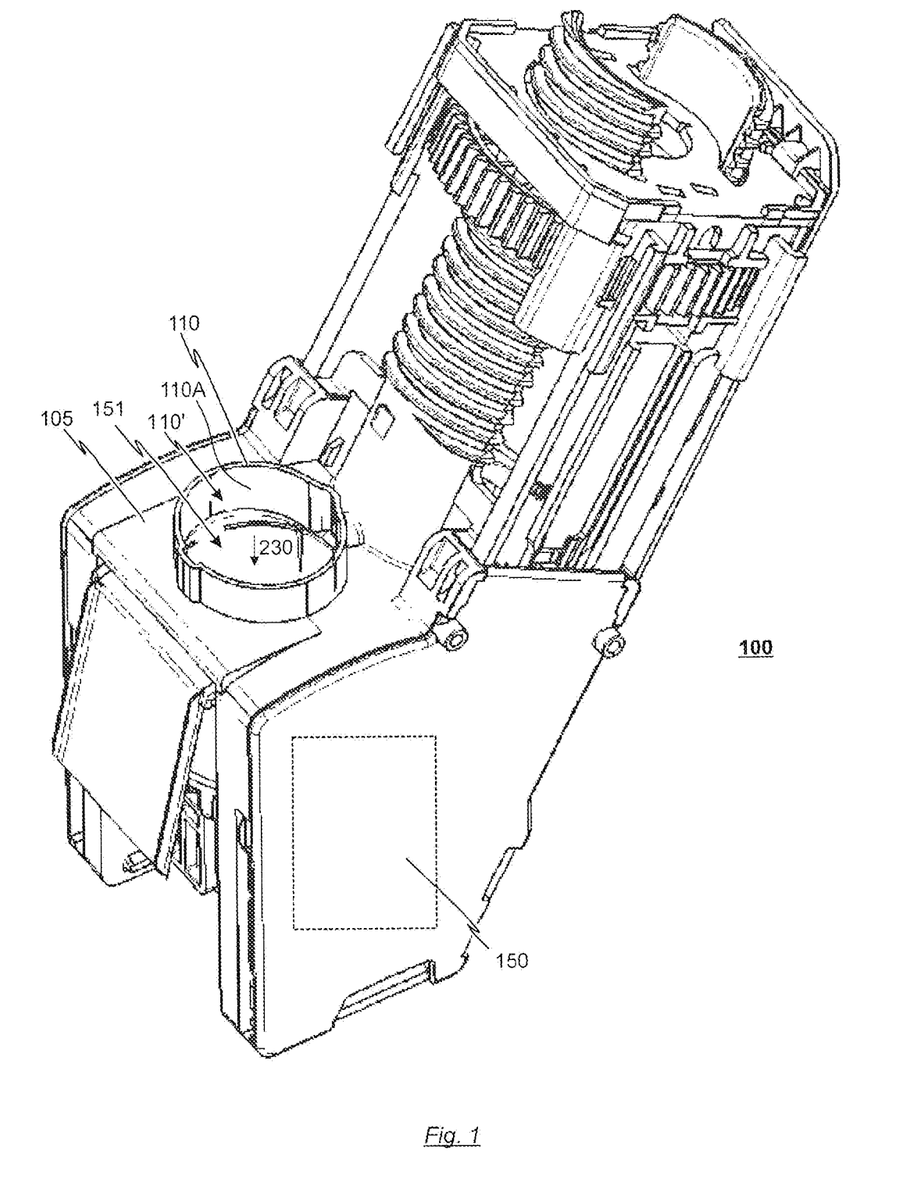
FIG. 1 shows a perspective side view of a brewing unit for a coffee machine according to the first form of embodiment of the invention.

In this:

FIG. 1 shows a perspective lateral view of an invented brewing unit 100 according to a first form of embodiment of the invention.

The brewing unit 100 has a brewing cylinder, surrounded by a housing, with a brewing chamber 150 formed therein, on the upper side of which a filling opening 151 is formed. As will be explained below in connection with the subsequent figures, within the brewing unit, when appropriately arranged in a coffee machine, the brewing cylinder can be positioned with regard to a grinder through pivoting movements or similar in such a way that ground coffee powder can be supplied through the filling opening 151. The brewing chamber 150, which is covered by the housing of the brewing unit in FIG. 1, is only shown with a broken line for better clarity. In the illustration in FIG. 1 a straight arrow designated 230 indicates a "filling direction" of the brewing chamber 150, i.e. it is to be assumed that ground product falling in the filling direction 230 through the filling opening 151 reaches the brewing chamber 150.

In accordance with the invention, at the filling opening 151 of the brewing chamber 150, more precisely above it, a projection 110 is provided which in the first form of embodiment is approximately cylindrical in shape, i.e. it has an essentially circular cross-section (in a plane perpendicular to the filling direction 230). As can be seen, in this example the projection 110 is designed as a wall ("powder collar") extending along a closed (essentially circular) curve with a closed inner circumferential surface.

Starting from the filling opening 151 this projection 110 extends away from the filling opening 151 with an essentially vertical circumferential side wall. In this example the projection 110 is arranged on a section 105 of a housing of the brewing unit 100 which forms an upper cover (hereinafter "upper cover 105") of the brewing chamber 150. As can be seen, the upper cover 105 has a through opening 110' corresponding to the filling opening 151 (open at the top and bottom), wherein the projection 110 extends along an edge of this through opening 110'.

It is pointed out that the shape of the cross-section of the projection 110 or the shape of the cross-section of the through opening 110' is not essential for the present invention. Alternatively it would also be possible to design the projection 110 in such a way that in a plane perpendicular to the filling direction 230 the shape of its cross-section departs arbitrarily from the shape shown in FIG. 1.

Figure 2:
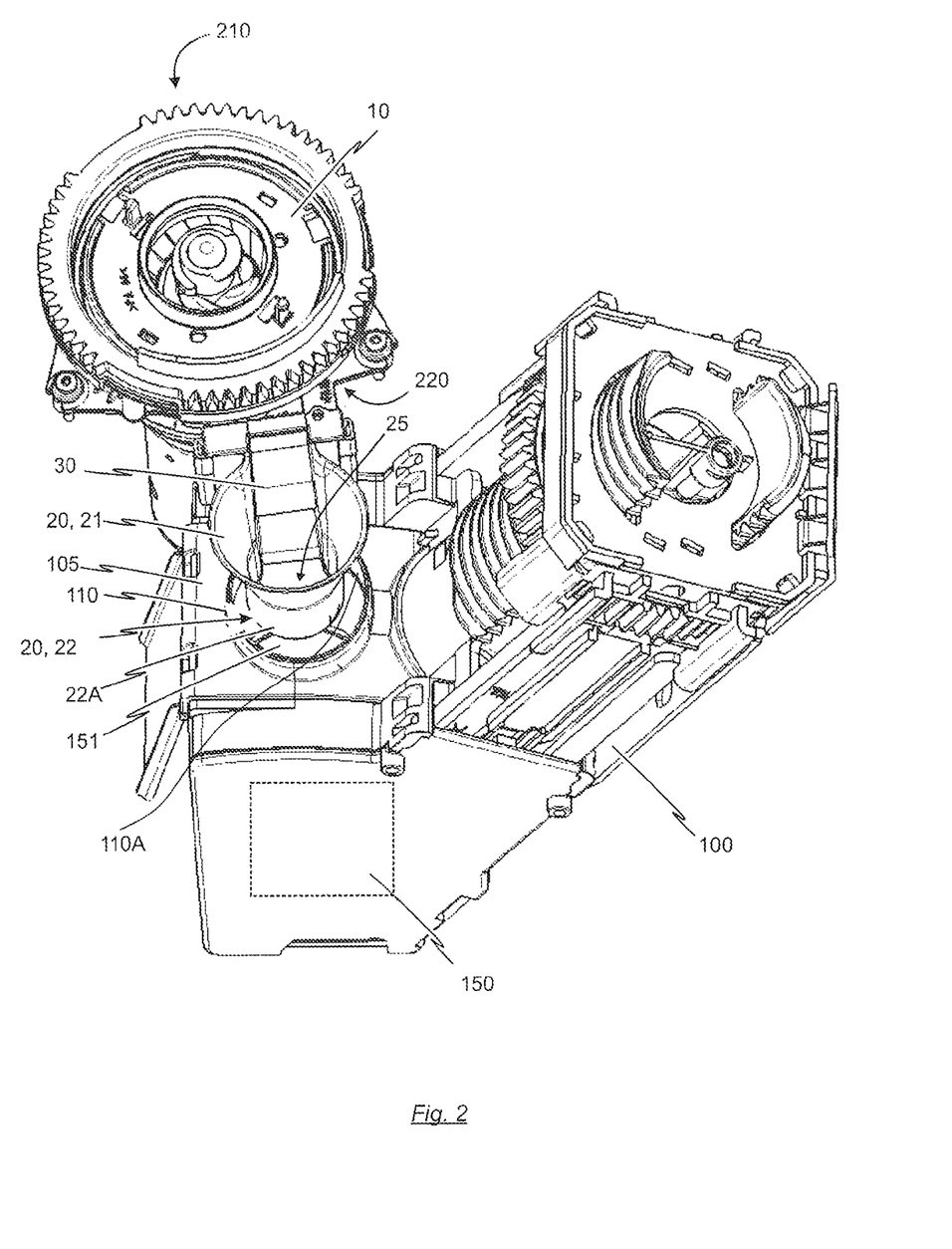
FIG. 2 shows a perspective side view of the brewing unit in FIG. 1 in a filling position relative to a grinder with a filling device.

FIG. 2 perspectively shows the brewing unit 100 from FIG. 1 in the filling position relative to a grinder 10. The grinder 10 has an infeed side 210 for roasted coffee beans or suchlike which are to be ground. It also has an outfeed or dispensing side 220 on which a grinding funnel 20 serving as a filling device is provided which has a deflection plate 30 serving as a guide device. The grinding funnel 20 has a conically tapering area 21 which is directed towards the outlet side 220 of the grinder 220 and is provided with the guide plate 30.

As can be seen in FIG. 2, an outlet section 22 of the grinding funnel 20 runs towards the filling opening 151 of the brewing chamber 150, i.e. the outlet area 22 of the grinding funnel 20 runs in the filling direction. This outlet section 22 opens into an outlet opening 25 of the grinding funnel 20, wherein the outlet opening 25 has a cross-section ("opening cross-section") which (in relation to its area) is smaller than the opening cross-section of the projection 110. In turn, the opening cross-section of the projection 110 is essentially the same as the opening cross-section of the filling opening 151 of the brewing chamber 150 or smaller than the opening cross-section of the filling opening 151 of the brewing chamber 150. The outlet area 22 of the filling device 20 has a side wall 22A extending along the outlet opening 25 and delimiting the outlet opening 22A.

The projection 110 is formed by a wall which extends along a closed curve running around the outlet area 22 of the filling device 20 and has an inner circumferential surface 110A which delimits the through opening 110'.

Figure 3:
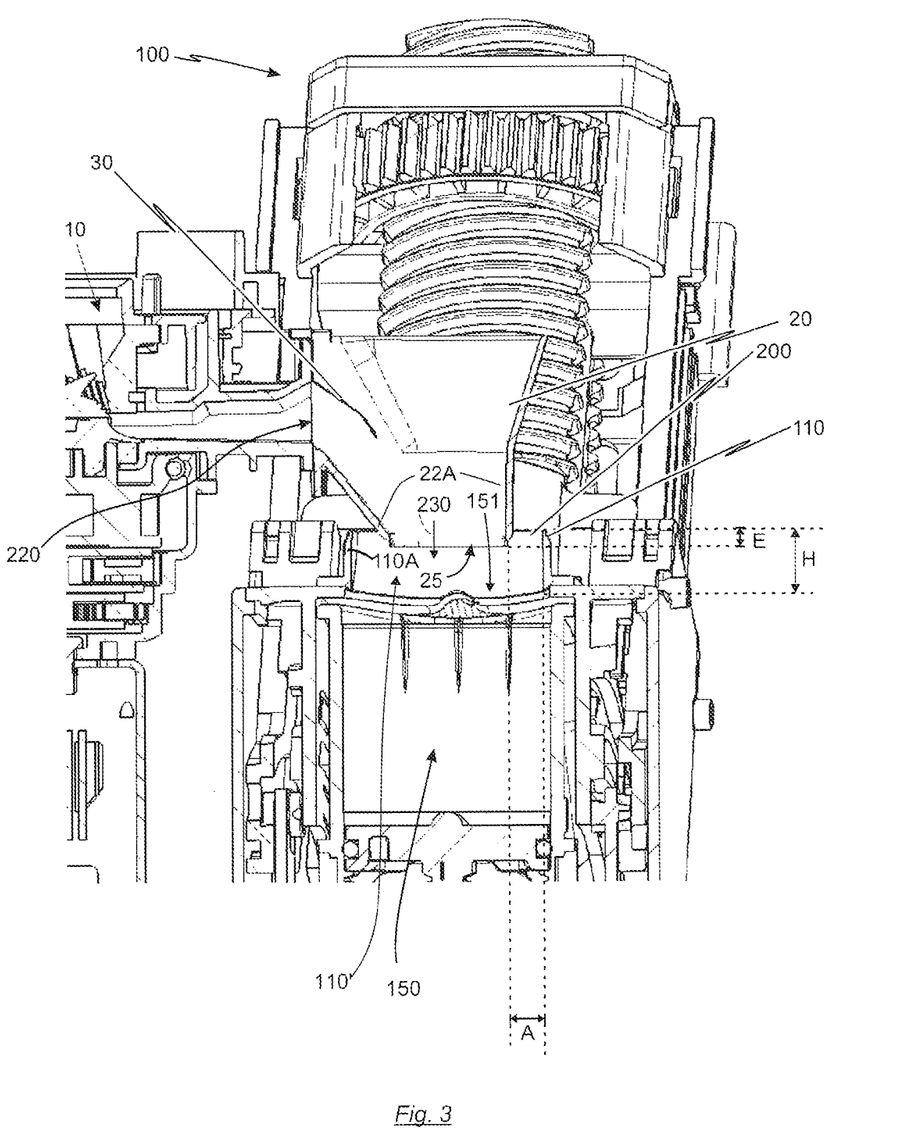
FIG. 3 shows a lateral cross-sectional view of a section of the brewing unit opposite the grinder in FIG. 2.
Figure 4:
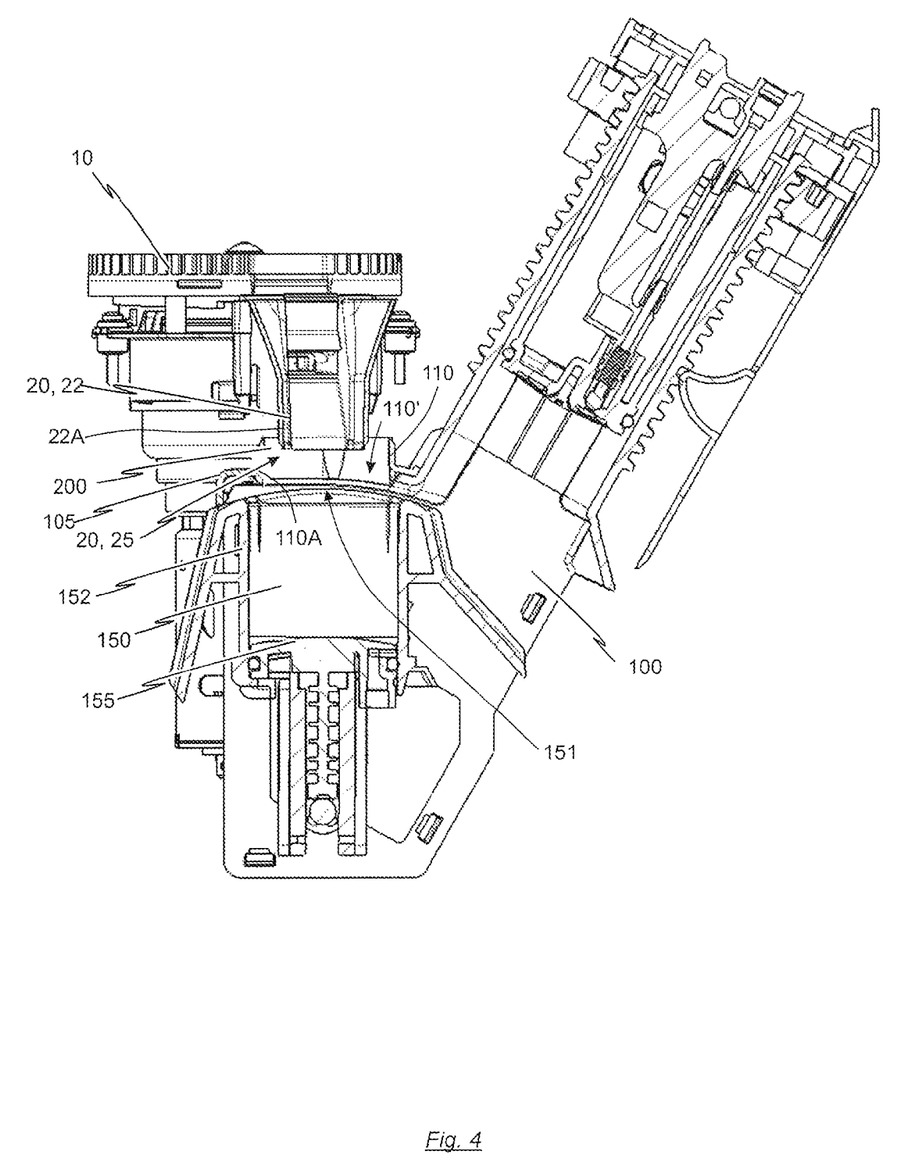
FIG. 4 shows a lateral cross-section view of the brewing unit according to the invention opposite the grinding funnel in FIG. 2.

As can be seen from the lateral cross-sectional view in FIGS. 3 and 4, this outlet section 22 of the grinding funnel 20 penetrates into the area of the projection 110, namely in such a way that the outlet opening 25 of the grinding funnel 20, which terminates this outlet section 22 of the grinding funnel 20 is essentially fully surrounded by the wall of the projection 110 with the formation of an intermediate space 200. The intermediate space 200 is formed between the inner circumferential surface 110A of the projection 110 and the side wall 22A of the outlet area 22, wherein the outlet area 22 is introduced into the through opening 110' of the projection 110 in such a way that the projection 110 essentially completely surrounds the outlet opening 25 of the outlet section 22 and the projection 110 does not contact the side wall 22A of the outlet area 22.

As can be seen in FIGS. 2 and 3 in particular, the projection 110 and the outlet area 22 of the filling device 20 are arranged relative to each other in such a way that coffee powder provided in the filling device 20 falls from the outlet opening 25 of the outlet area 22 directly through the through opening 110' of the projection 110 and the filling opening 151 into the brewing chamber 150 without hitting the inner circumferential surface 110A of the projection 110 when falling through the through opening 110'. Starting from the outlet opening 25, the coffee powder provided in the filling device 20 essentially falls along the filling direction 230 at a distance from the inner circumferential surface 110A of the projection 110.

The projection 110 itself is in the form of a wall (powder collar) with a wall height H of between 5 mm and 50 mm.

In the filling position, the lower end of the outlet area 22 of the grinding funnel 20, i.e. the outlet opening 25 of the grinding funnel 20, is introduced into an inner area 110' of the projection surrounded by the wall of the projection 110 with a penetration depth E, which, in relation to the upper end of the wall, is at least 1 mm and no greater than the wall height H. The penetration depth E is preferably around 1 mm to 20 mm.

In this example, the distance A between the side wall of the outlet area 22 and the wall of the projection 110 is essentially the same at every point of the circumference and is between 1 mm and 20 mm. The distance A in the intermediate space as well as the penetration depth E of the outlet area 22 of the grinding funnel 20 ensure that a large air gap is formed overall. In terms of its dimensions this air gap is such that a displacement airflow, which is produced when filling ground product into the brewing chamber 150 through the displacement of air by way of the ground product sprinkling out of the grinding funnel 20 into the brewing chamber 150, is quickly and efficiently conveyed out of the brewing unit 100 via the air gap so that a sudden increase in the air pressure in the brewing chamber 150 can largely be avoided. This latter considerably reduces the risk that ground product (coffee powder) could leave the brewing chamber 150 when filling the ground product into the brewing chamber 150 so that the formation of deposits of ground product outside the brewing chamber 150 is effectively reduced.

This displacement airflow and the associated swirling up of the ground product increasingly occur in conventional brewing units if the brewing chamber 150 in the brewing cylinder 152 is to be filled with the maximum possible quantity of ground product. Through the provision of the projection 110 and its special arrangement and design, in particular through the provision of the intermediate space 200, said swirling up of the ground product is reduced. As a result of this, unwanted deposits on the upper side of the brewing unit are reduced further.

In order to minimise the electrostatic charging effect, the relevant, preferably obliquely formed edges both of the outlet area of the grinding funnel 20, i.e. the outlet opening 25 of the grinding funnel 20, and also of the projection 110 are relatively thin, i.e. with wall thicknesses of between 0.5 mm and 3 mm. The displacement airflow is also deliberately directed upwards.

Through a design of this type the effect of reducing unwanted depositing is improved.

Figure 5:
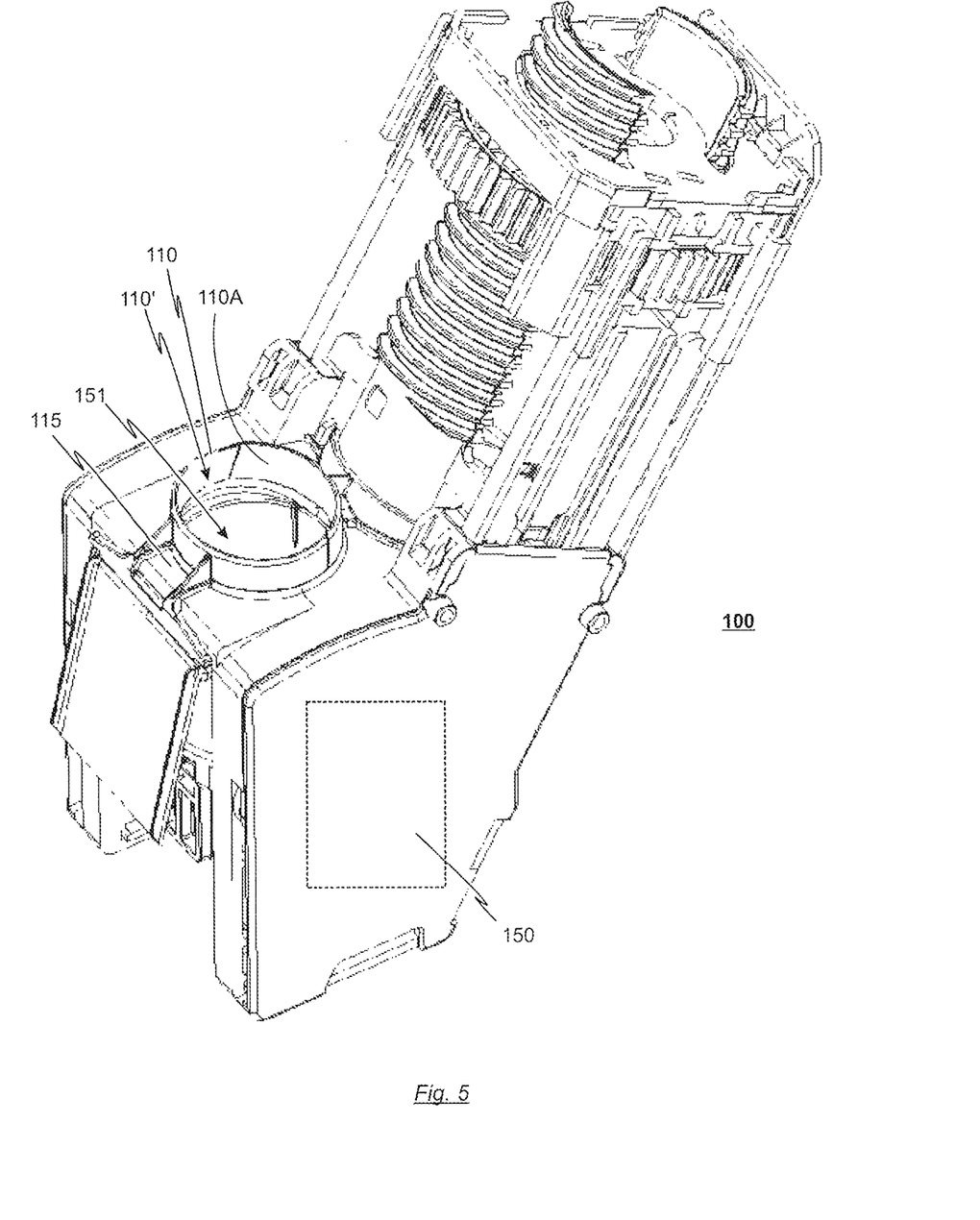
FIG. 5 shows a perspective side view analogue to FIG. 1 of the invented brewing unit according to a second form of embodiment of the invention.

FIG. 5 shows a lateral perspective view analogue to FIG. 1. In this second form of embodiment of the invention shown in FIG. 5, the projection 110 is detachably fastened to the brewing unit 100 by means of a clip-type device 115 so that an existing brewing unit can be retrofitted with the projection 110. It is of course also conceivable to use other fastening means, instead of the clip-type device 115 to detachable fasten the projection 110 to the brewing unit 100, for example a screw-type device or a snap-type device.

Figure 6:
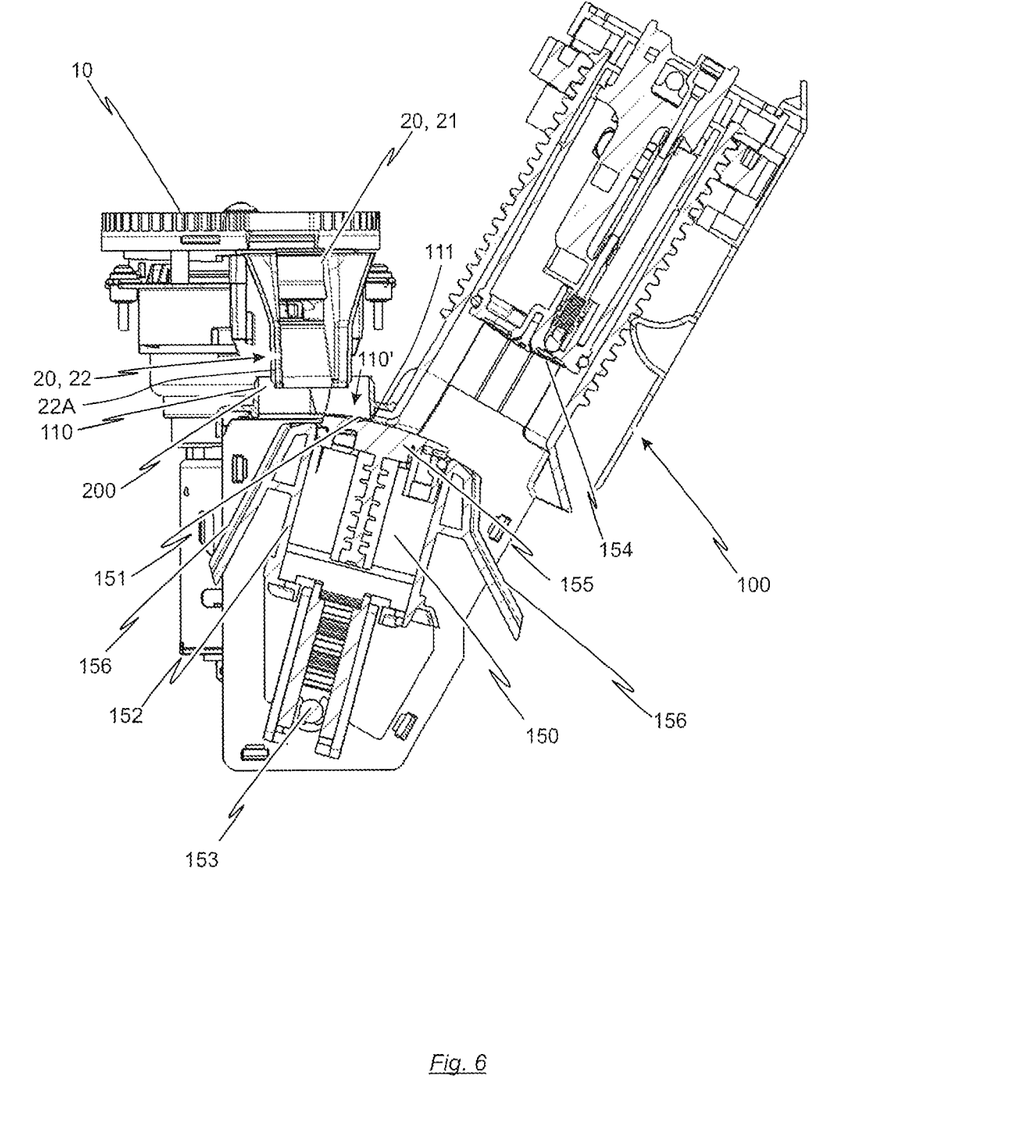
FIG. 6 shows a lateral cross-sectional view of a brewing unit relative to a grinder with a filling device according to a third form of embodiment of the invention.

FIG. 6 shows a lateral cross-sectional view of a brewing unit relative to a grinder with a filling device in accordance with a third form of embodiment of the invention.

Arranged within the brewing unit 100 shown there is a brewing cylinder 152 which is pivotable around a pivoting axis 153 and which in turn has the brewing chamber 150 that can be filled with ground product. In pivoting position shown in FIG. 6 the brewing cylinder 152 is half-way between a brewing pivoting position in which the filling opening 151 of the brewing chamber 150 would be flush with a brewing plunger 154, and a filling position in which the filling opening 151 would be flush with the provided projection 110 and with the outlet area 22 of the grinding funnel 20.

The brewing cylinder 152 shown in the figure has a base 155 which delimits the brewing chamber 150 and which can be moved in the brewing cylinder 152 in the direction of the longitudinal axis of the brewing cylinder 152. In the brewing cylinder 152 shown in FIG. 6, its base 155 is moved into an discharge or ejection position in which used ground product, compressed to form a cake of coffee grounds, can be ejected from a discharge opening of the brewing unit 100 arranged in the vicinity of the brewing plunger 154.

In the shown brewing unit 100 according to the third form of embodiment of the invention the projection 110, as in the first form of embodiment shown in FIG. 1, is formed integrally with the brewing unit 100. Additionally to the first form of embodiment, at the lower end of the projection 110 a skimming device 111 made of an elastomer is provided which, during a pivoting movement of the brewing cylinder 152 about the pivoting axis 153 and thereby a pivoting movement of the filling opening 151 of the brewing chamber 150 with regard to the projection 100, skims excess coffee powder on the upper edge of the brewing cylinder 152 or on the base 150 and, thus, reduces unwanted ground product deposits. The coffee powder skimmed by the skimming device 111 can fall downwards on a discharge slide 156, arranged outside the brewing chamber 150 and attached, for example, to the brewing cylinder 152, and, if necessary, collect in a collection container arranged underneath the brewing cylinder 152 or in a collecting dish (not shown in the figures).

Figure 7:
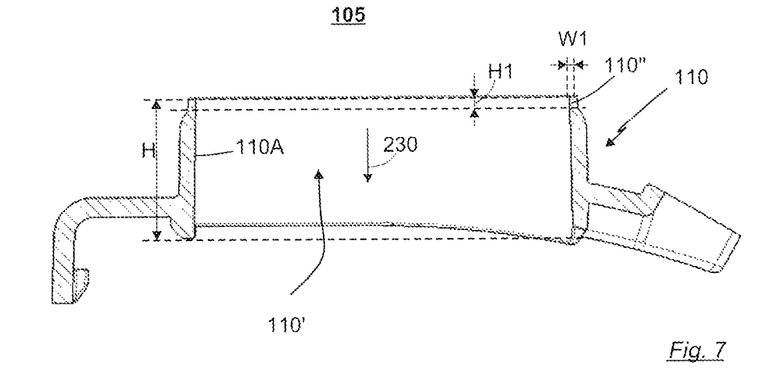
FIG. 7 shows a cover of the brewing chamber of the brewing unit according to FIG. 4 with an integrated projection in a lateral cross-sectional view as in FIG. 4 but enlarged.

FIG. 7 shows a further form of embodiment of a projection 110 in which the projection 110 is formed of a wall, the wall thickness of which is varied along the filling direction 230. In the case of FIG. 7 the projection 110 is integrated into the upper cover 105 of the brewing chamber 150 of the brewing unit 110, as in the form of embodiment according to FIG. 4. In the present case the projection 110/the upper cover 105 is shown in a lateral cross-sectional view (as in FIG. 4). In the present example the projection 110 is formed of a wall, the wall thickness of which tapers towards the upper end so that at the upper end of the projection 110 the wall is as thin as possible. In this way it is ensured that the projection 110 as a whole has a high mechanical stability on the one hand and on the other hand (due to the small wall thickness at the upper end of the projection 110) the influence of electrostatic charging effects on coffee powder at the upper end of the projection 110 is drastically reduced. In order to clearly reduce the influence of electrostatic charging effects on coffee powder it is, for example, expedient, that at its upper end, the wall forming the projection 110—at least in a wall section 110" which extends over a height H1 of 0.5 mm to 5 mm with regard to the upper end of the wall—has a wall thickness W1 of 0.5 mm to 1 mm (as indicated in FIG. 7).

Figure 8:
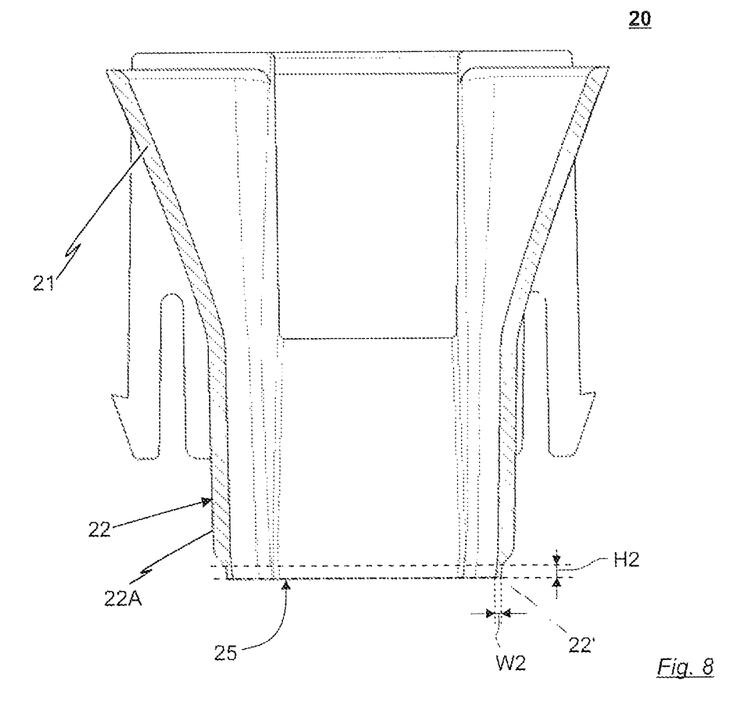
FIG. 8 shows the grinding funnel according to FIG. 4 in a lateral cross-sectional view as in FIG. 4, but enlarged.

FIG. 8 shows a further form of embodiment of a grinding funnel 20 acting as a filling device, the outlet area of 22 of which is formed as a side wall 22a extending along the outlet opening 25 of the outlet area 22 and delimiting the outlet opening 25, wherein the outlet opening 25 is arranged at a lower end of the side wall 22A. In the case of the form of embodiment according to FIG. 8, the wall thickness of the side wall 22A tapers in the direction of the outlet opening 25 so that the side wall 22A at the lower end of the outlet area 22 or at the outlet opening 25 is as thin as possible. In this case the grinding funnel 20 is shown in a lateral cross-section (as in FIG. 4). In this way it is ensured that, on the one hand, the grinding funnel 20 as whole has a high mechanical stability and, on the other hand, the influence of electrostatic charging effects on coffee powder at the lower end of the outlet area 22 or the outlet opening 25 is drastically reduced (due to the small wall thickness of the grinding funnel at the lower end of the outlet area 22 or at the outlet opening 25). In order to considerably reduce the influence of electrostatic charging effects on coffee powder it is, for example, expedient that the side wall 22A of the outlet area 22 at its lower end—at least in a wall section 22' of the side wall 22A, which extends over a height H2 of 0.5 mm to 5 mm with regard to the lower end of the side wall 22A—has a wall thickness W2 of 0.5 mm to 1 mm (as shown in FIG. 8).

In the forms of embodiment shown in the figures, in each case the through opening 110' of the projection 110 is designed in such a way that the inner circumferential surface 110A is essentially parallel to the filling direction 230 and/or parallel to a vertical. It is pointed out that this shape of the through opening 110' is not essential for the invention. The inner circumferential surface 110A can, for example, be inclined in relation to the filling direction 230 and/or to a vertical, for example also in such a way that the through opening 110' tapers towards the top or the bottom.

The invention claimed is:

1. Brewing unit (100) for a coffee machine, wherein the brewing unit (100) has a brewing chamber (150) which can be filled with ground coffee powder by means of a filling device (20), wherein the brewing chamber (150) comprises a filling opening (151) for filling the coffee powder in a filling direction (230), wherein arranged above the filling opening (151) is a projection (110) extending to outside of the brewing chamber (150) in the filling direction (230),
wherein the filling device (20) has an outlet area (22) which comprises an outlet opening (25) for the coffee powder and a side wall (22A) extending along the outlet opening (25) and delimiting the outlet opening (25),
wherein the projection (110) is formed by a wall which extends along a closed curve running around the outlet area (22) of the filling device (20) and has an inner circumferential surface (110A) which delimits a through opening (110'), which is open at the top and bottom, of the projection (110) and is configured in such a way that the outlet area (22) of the filling device (20) is introduced into the through opening (110') of the projection (110), forming an intermediate space (200) between the inner circumferential surface (110A) of the projection (110) and the side wall (22A) of the outlet area (22), in such a way that the projection (110) essentially completely surrounds the outlet opening (25) of the outlet area (22) and the projection (110) is not in contact with the side wall (22A) of the outlet area (22),
wherein
the projection (110) and the outlet area (22) of the filling device (20) are arranged relative to each other in such a way that coffee powder provided in the filling device (20) falls from the outlet opening (25) of the outlet area (22) directly through the through opening (110') of the projection (110) and the filling opening (151) into the brewing chamber (150) without hitting the inner circumferential surface (110A) of the projection (110) when falling through the through opening (110').

2. Brewing unit (100) according to claim 1, wherein the filling device (20) has at least one grinding funnel at the lower end of which the outlet area (22) is formed, wherein the outlet area (22) has an opening cross-section which is smaller than the opening cross-section of the projection (110) in such a way that in the intermediate space (220) the outlet area (22) is at a distance (A) of between 1 mm and 20 mm from the projection (110).

3. Brewing unit (100) according to claim 1, wherein the projection (110) is formed integrally with the brewing unit (100).

4. Brewing unit (100) according to claim 1, wherein the projection (110) is designed to be detachable from the brewing unit (100) and, in particular, is provided with a screw, snap or clip-type device (115) for the optional equipping of the brewing unit (100), wherein a complementary screw, snap or clip-type device is provided on the brewing unit (100).

5. Brewing unit (100) according to claim 1, wherein the inner circumferential surface (110A) has a high-gloss surface.

6. Brewing unit (100) according to claim 1 wherein the wall of the projection (110) has an upper end and a wall height (H) of between 5 mm and 50 mm.

7. Brewing unit (100) according to claim 6, wherein the outlet area (22) of the filling device (20) is introduced into the through opening (110') of the projection (110) with a penetration depth (E) which—in relation to the upper end of the wall—is at least 1 mm and no greater than the wall height (H).

8. Brewing unit (100) according to claim 6, wherein the wall, forming the projection (110), has at its upper end—at least in a wall section (110") which in relation to the upper end of the wall extends over a height (H1) of 0.5 mm to 5 mm—a wall thickness (W1) of 0.5 to 1 mm.

9. Brewing unit according to claim 1, wherein the outlet opening (25) of the outlet area (22) is arranged at a lower end of the side wall (22A), wherein at its lower end—at least in a wall section (22') of the side wall (22A), which in relation to the lower end of the side wall (22A) extends over a height (H2) of 0.5 mm to 5 mm—this side wall (22A) has a wall thickness (W2) of 0.5 mm to 1 mm.

10. Brewing unit (100) according to claim 1, wherein the filling device (20) also has at least one guide device (30), more particularly a guide plate, wherein the at least one guide device (30) is designed to passively supply the coffee powder to be filled to the filling opening (151) of the brewing chamber (150).

11. Coffee machine with at least one grinder (10) and with a brewing unit (100) according to claim 1, wherein the brewing unit (100) has a brewing cylinder (152), in which the brewing chamber (150) is formed, wherein the brewing cylinder (152) is movable vis-à-vis the projection (110), wherein a soft material (111) is provided, which is provided on the projection (110) and which is designed to skim off excess ground coffee powder during the movement of the brewing cylinder (152).

12. Coffee machine according to claim 11, wherein the movement of the brewing cylinder (152) is a pivoting movement within the brewing unit (100).

13. Coffee machine according to claim 11 wherein arranged outside the brewing chamber (150) is a discharge slide (156), which is designed to convey coffee powder skimmed off by means of the soft material (111) into a collection container or collecting dish.

* * * * *